US009430481B2

(12) United States Patent
Archer et al.

(10) Patent No.: US 9,430,481 B2
(45) Date of Patent: *Aug. 30, 2016

(54) STORAGE DISK FILE SUBSYSTEM AND DEFECT MANAGEMENT SYSTEMS AND METHODS

(71) Applicant: Lenovo Enterprise Solutions (Singapore) PTE. LTD., Singapore (SG)

(72) Inventors: David W. Archer, Sammamish, WA (US); Nils P. J. Hansson, Monroe, WA (US); Paul A. Skoglund, Bellevue, WA (US); James L. Wooldridge, Fall City, WA (US)

(73) Assignee: LENOVO ENTERPRISE SOLUTIONS (SINGAPORE) PTE. LTD., Serangoon Garden (SG)

( * ) Notice: Subject to any disclaimer, the term of this patent is extended or adjusted under 35 U.S.C. 154(b) by 258 days.

This patent is subject to a terminal disclaimer.

(21) Appl. No.: 14/173,881

(22) Filed: Feb. 6, 2014

(65) Prior Publication Data

US 2014/0372600 A1 Dec. 18, 2014

Related U.S. Application Data

(63) Continuation-in-part of application No. 13/919,026, filed on Jun. 17, 2013.

(51) Int. Cl.
*G06F 17/30* (2006.01)
*G06F 11/36* (2006.01)
*G06F 11/07* (2006.01)

(52) U.S. Cl.
CPC ..... *G06F 17/30067* (2013.01); *G06F 11/0727* (2013.01); *G06F 11/0748* (2013.01); *G06F 11/0766* (2013.01); *G06F 11/36* (2013.01)

(58) Field of Classification Search
CPC .... G06F 3/0665; G06F 3/067; G06F 3/0631; G06F 3/0608; G06F 3/0647; G06F 3/0605
See application file for complete search history.

(56) References Cited

U.S. PATENT DOCUMENTS 6,904,599 B1 * 6/2005 Cabrera ................ G06F 3/0605
711/112
7,856,616 B2 12/2010 Chang et al.
(Continued)

FOREIGN PATENT DOCUMENTS

EP 2547069 A1 1/2013
WO 2013124752 A1 8/2013

OTHER PUBLICATIONS

Beek, MHT. et al.; "Model Checking Publish/Subscribe Notification for thinkteam"; FMICS 2004 Preliminary Version; Electronic Notes in Theoretical Computer Science; http://www.think3.com; http://www.elsevier.nl/locate/entcs; 2004.
(Continued)

*Primary Examiner* — Peling Shaw
(74) *Attorney, Agent, or Firm* — Olive Law Group, PLLC (57) ABSTRACT

In accordance with one or more embodiments of the present invention, methods and systems disclosed herein provide for storage disk file and defect management. According to an aspect, a method includes communicating, to a first computing device, an identifier associated with a storage device. The method also includes receiving, from the first computing device, maintenance information associated with the identifier. Further, the method also includes implementing a storage disk file management policy at the storage device based on the maintenance information. Maintenance or defect information may be provided, for example, for a disk subsystem comprised within a storage device. A disk subsystem with an identified potential defect, even though potential defect is latent, creates a risk to the software workloads running on the IT resource and a potential hazard in a datacenter.

20 Claims, 6 Drawing Sheets

(56) References Cited

U.S. PATENT DOCUMENTS

| | | |
|---|---|---|
| 7,917,897 B2 | 3/2011 | Bassin et al. |
| 7,945,426 B2 | 5/2011 | Kostyk et al. |
| 8,140,514 B2 | 3/2012 | Nguyen et al. |
| 8,151,248 B1 | 4/2012 | Butler et al. |
| 8,265,892 B2 | 9/2012 | Matsuda et al. |
| 2002/0133669 A1* | 9/2002 | Devireddy ............ G06F 3/0605 711/114 |
| 2006/0095705 A1* | 5/2006 | Wichelman ........... G06F 3/0605 711/171 |
| 2009/0089757 A1 | 4/2009 | Rajan et al. |
| 2009/0273669 A1 | 11/2009 | Wertsman et al. |
| 2010/0235832 A1* | 9/2010 | Rajagopal ............ G06F 3/0605 718/1 |
| 2010/0332452 A1* | 12/2010 | Hsu ................... G06F 17/30156 707/640 |
| 2012/0167053 A1 | 6/2012 | Marum et al. |
| 2012/0233599 A1 | 9/2012 | Valdiviezo Basauri et al. |
| 2014/0095826 A1* | 4/2014 | Rajagopal ............ G06F 3/0605 711/170 |

OTHER PUBLICATIONS

Zhao, Y. et al.; "DYNATOPS: A Dynamic Topic-based Publish/Subscribe Architecture"; Dept of Information and Computer Science, University of California, Irvin; Jul. 2013.

VMWare White Paper; Proactive Incident and Problem Management; ItemNo. VMW_12Q3_WP_Proactive-Incident_0812_ Version 1.0; copyright 2012 VMware, Inc., Palo Alto CA; 17 pages.

Liang et al., "An Effective Defect Detection and Warning Prioritization Approach for Resource Leaks," COMPSAC IEEE 36th Annual Inter. Conf on, Jul. 16-20, 2012, pp. 119-128.

IP.com et al.; "A Method and System for Automatic Defect Classification and Assignment", IPCOM000220570D, Aug. 7, 2012, pp. 1-8.

* cited by examiner

STORAGE DISK FILE SUBSYSTEM AND DEFECT MANAGEMENT SYSTEMS AND METHODS

CROSS REFERENCE TO RELATED APPLICATIONS

This is a continuation-in-part application of co-pending U.S. patent application Ser. No. 13/919,026, filed Jun. 17, 2013, and titled WORKLOAD AND DEFECT MANAGEMENT SYSTEMS AND METHODS, the content of which is hereby incorporated by reference in its entirety. This application is related to and claims the benefit of co-pending U.S. patent application Ser. No. 13/920,351, filed Jun. 18, 2013, and titled WORKLOAD AND DEFECT MANAGEMENT SYSTEMS AND METHODS, the content of which is hereby incorporated by reference in its entirety.

BACKGROUND

1. Field of the Invention

The present invention relates to storage disk file subsystem and defect management systems and methods.

2. Description of Related Art

In today's information technology (IT) environments, automated workload and storage management is leveraged for power management of IT resources, performance management of IT resources, and predictive failure analysis of IT resources. By leveraging industry virtualization features that encapsulate entire software workloads, software workloads and virtual disk files can be migrated from an IT resource that appears to be failing to an IT resource that is healthy.

For IT component defects discovered by the component's manufacturer, it can be difficult to manage the workload running on IT resources that include these components. This is because system managers may not become aware of such defects until a problem arises. These defects can be especially problematic in the case of defects in components having critical importance to a system. For at least these reasons, it is desired to provide improved systems and techniques for managing workload stored or running on IT resources with critical components or other components in the case of a defect.

BRIEF SUMMARY

In accordance with one or more embodiments of the present invention, methods and systems disclosed herein provide for storage disk file subsystem and defect management. According to an aspect, a method includes communicating, to a first computing device, an identifier associated with a storage device. The method also includes receiving, from the first computing device, maintenance information associated with the identifier. Further, the method also includes implementing a storage disk file subsystem management policy at the storage device based on the maintenance information.

DETAILED DESCRIPTION

As described herein, there are various embodiments and aspects of the present invention. According to embodiments, the present invention is directed to workload and defect management systems and methods. The presently disclosed subject matter can assist with providing high availability of workloads, particularly software workloads for example. In accordance with embodiments, the present subject matter can integrate engineering change advisory (ECA) error handling for critical defects within the domain of predictive failure analysis and workload management. Further, for example, the present subject matter can be used for improving ECA communication and discover process.

Figure 1:
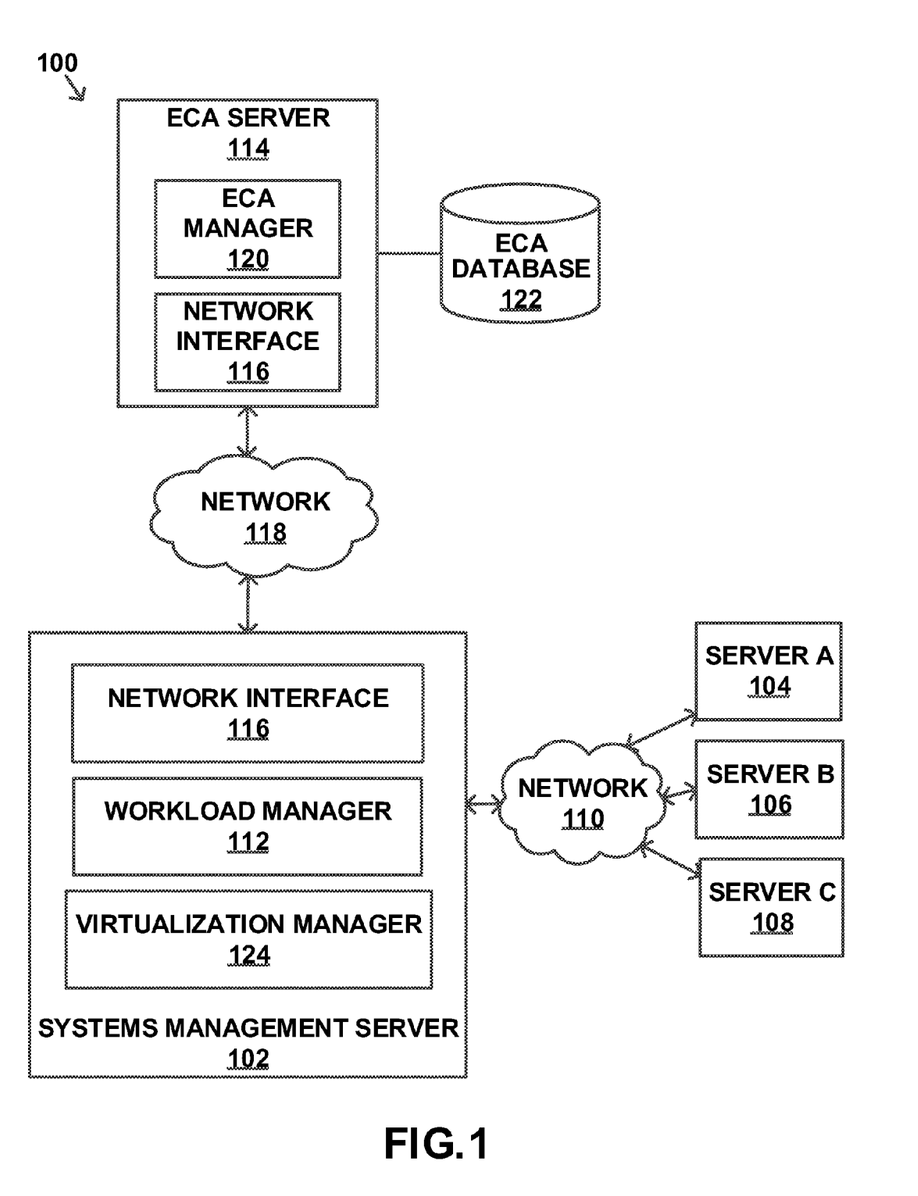
FIG. 1 is a block diagram of an example workload and defect management system in accordance with embodiments of the present invention.

Referring now to FIG. 1, the figure illustrates a block diagram of an example workload and defect management system 100 in accordance with embodiments of the present invention. The system 100 includes a systems management server 102 communicatively connected to multiple servers A, B, and C 104, 106, and 108 within a server farm or server cluster. Servers 102, 104, 106, and 108 may be connected via any suitable network 110 such as a local area network (LAN) or other suitable type of network. The server 102 may manage the operations of servers 104, 106, and 108 as they operate in an enterprise environment for serving one or more entities. The servers 104, 106, and 108 may be operating in, for example, a virtualized workload platform, a distributed stateless workload platform, a stateful workload platform, or the like. Further, the servers 104, 106, and 108 may be primary and/or backup servers, and may be collocated with network switches and/or routers which enable communication between the different parts of the cluster and entities using the cluster. Although only four servers are shown in FIG. 1, it should be understood that any suitable numbers of servers of any suitable type may be operated and have functionality in accordance with embodiments of the present invention.

Servers 102, 104, 106, and 108 may each include any suitable hardware, software, firmware, and combinations thereof. For example, a server may include a high-capacity hard drive, a fan or other cooling equipment, a power supply, and other components. A server may also run a suitable operating system. The servers may each have different types of components associated with one another and some may have components that are the same or similar. The server 102 may maintain a database of identifiers for all or some of the components of the servers 104, 106, and 108 and/or the servers. More particularly, a workload manager 112 residing within the server 102 may receive information about servers 104, 106, and 108 and other servers, including identifiers of components within the servers or identifiers of the servers.

Example identifiers include, but are not limited to, a machine type, a model number, a serial number, the like, or combinations thereof. As described in more detail herein, such identifiers may be used by the workload manager 112 for workload and defect management in accordance with embodiments of the present invention.

The workload manager 112 may be implemented by hardware, software, firmware, or combinations thereof. For example, the workload manager 112 may be implemented by one or more processors and memory of the server 102. Alternatively, the workload manager 112 may be implemented by multiple servers managing the servers 104, 106, 108 and other servers. In this example, the workload manager 112 is implemented by an application operating on the server 102.

In an example, identifiers can be created as part of server 102 inventory collection functionality. Identifiers can be created for all inventoried IT resources. IT resource inventory can be achieved by server 102 polling servers 104, 106, and 108 for their system identifiers. Alternatively, server 102 can gather identifier inventory by collecting inventory broadcast messages from server 104, 106, or 108. Server 102 can store the inventoried identifiers in a persistent data store that resides on server 102, or on an external database connected by a network to server 102.

Figure 2:
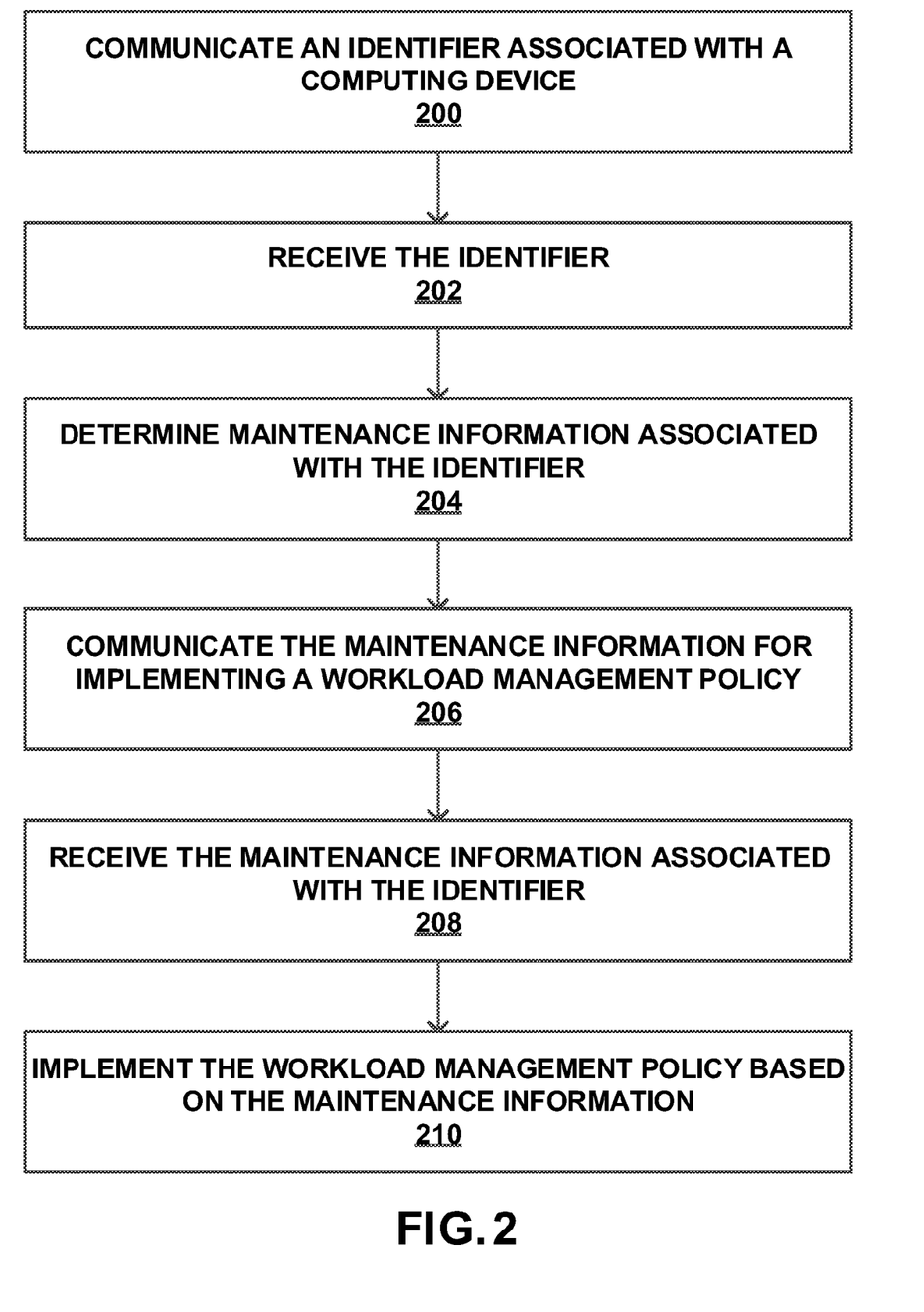
FIG. 2 is a flowchart of an example method for workload and defect management in accordance with embodiments of the present invention.

FIG. 2 illustrates a flowchart of an example method for workload and defect management in accordance with embodiments of the present invention. For purpose of illustration of this method, examples make reference to the server 102 and an engineering change advisory (ECA) server 114 for implementation of the method, although it should be understood that the method may be implemented by one or more other computing devices that are suitably configured. The ECA server 114 may include one or more processors and memory.

Referring to FIG. 2, the method includes communicating 200, to a computing device, an identifier associated with another computing device. For example, the server 102 may have stored in its memory or another accessible memory, identifiers for servers 104, 106, and 108 and one or more of the servers' components. This identification information may be communicated to the ECA server 114. For example, the workload manager 112 may control a network interface 116 of the server 102 to communicate the identifiers to the ECA server 114 via a network 118 or any other suitable communications system. In an example, the ECA server 114 may be remotely located from the server 102, and the network 118 may be the Internet and/or one or more other networks.

The method of FIG. 2 includes receiving 202 the identifier. Continuing the aforementioned example, the identifiers may be received at the ECA server 114 by its network interface 116. The ECA server 114 may include an ECA manager 120 configured to receive the identifiers from the network interface 116 and to store the identifiers within an ECA database 122. The ECA server 114 may suitably associate the stored identifiers with the server 102. For example, the ECA server 114 may store information in the database 122 indicating that the identifiers correspond to servers and their components managed by the server 102.

The ECA server 114 may be implemented by hardware, software, firmware, or combinations thereof. For example, the ECA server 114 may be implemented by one or more processors and memory of the server 114. Alternatively, the ECA server 114 may be implemented by multiple servers in communication with one or more server clusters, such as the cluster associated with the server 102. In this example, the ECA server 114 is implemented by an application operating on the server 114.

The method of FIG. 2 includes determining 204 maintenance information associated with the identifier. Continuing the aforementioned example, the ECA database 122 may be maintained with and store current maintenance information regarding computing devices and computing device components. Particularly, the ECA database 122 may store maintenance information and associate the maintenance information with identifiers such as machine type, model number, and serial number. Example maintenance information includes, but is not limited to, a defect notice concerning a computing device or a component of a computing device. For example, a defect notice may concern a component of the server 106. In another example, maintenance information may include a defect severity level, such as information about whether the defect is critical or not. In yet another example, maintenance information may include critical rationale information such as information about a data corruption risk, additional component failure risk, environmental hazard risk, and the like. In another example, the data stored in the ECA database 122 may be an attribute flag for a critical component defect such as a defect that can result in data corruption, a failure that can result in damage to other components, a failure that can result in an environmental hazard, the like, or combinations thereof. The ECA manager 120 may compare one of the received identifiers to the stored maintenance information to determine whether there is, for example, a defect notice about a component associated with the identifier.

Example defect notices include, but are not limited to, a recall notice, a required service notice, and the like. Such notices may be indicative of a current or prospective problem for a computing device or component identified by the notice. As an example, such defects could result in damage to other computing devices or components, data corruption, an environmental hazard in a data center or other facility, or the like. For at least these reasons, there is a motivation to quickly manage the system in response to such a notice being reported. The notices may be included in the ECA database and may be created by engineering or support personnel using standard end user interface software interfaces to the ECA manager.

The method of claim 2 includes communicating 206 the maintenance information for implementing a workload management policy. Continuing the aforementioned example, the ECA manager 120 may determine that there is a defect notice for a component of the server 106. The ECA manager 120 may use the component's identifier to lookup the defect notice. Subsequently, the ECA manager 120 may control the network interface 116 of the server 114 to communicate the defect notice or a portion of the defect notice to the server 102. Alternatively, for example, the ECA manager 120 may generate a message based on the defect notice and may communicate the message to the server 102. The message may include basic or minimal information to indicate a defect with the component along with the component identifier.

The method of claim 2 includes receiving 208 the maintenance information associated with the identifier. Continuing the aforementioned example, server 102 may receive the defect notice and component identifier from the server 114 via the network 118. The workload manager 112 may compare the component identifier to its known components among servers 104, 106, and 108 to determine whether any of the servers include the component.

The method of FIG. 2 includes implementing 210 a workload management policy based on the maintenance information. For example, in response to receipt of the defect notice and component identifier, the workload manager 112 may implement a workload management policy. The policy may be implemented in response to determining that one or more of the servers include the identified component.

In accordance with embodiments of the present invention, a workload management policy may involve migrating workload handled by a computing device to another computing device. For example, a server may be identified as having a defective component. In response to identifying the server, a systems management server may migrate some or all of the workload of the server to a backup server. In the example of FIG. 1, the workload manager 112 may receive a notice from the ECA server 114 that a component of the server 106 is defective. In this case, the workload manager 112 may migrate some or all of the software workload being handled by the server 106 to the server 104. For example, the workload management server 112 may send a request to a virtualization manager 124 to migrate software workload from the server 106 to the server 104, a server not affected by a defect. Subsequently, for example, the server 102 may control the server 106 to power off, send an alert to an administrator or operator of the cluster (e.g., an email alert), implementing a risk mitigation function at the computing device, configuring firmware of a component on the computing device, the like, or combinations thereof. In another example, a mitigation procedure may be implemented such as configuring the server 102 to configure the component or the server system to mitigate the critical risk. A risk may be mitigated by implementing a risk mitigation function based on this operational risk information such as, for example, keeping fans running at a specified level, keeping power capped at a specified level, and the like.

In accordance with embodiments of the present invention, a workload manager, such as workload manager 112, may determine whether a server can manage a workload intended for migration before migrating the workload to the server. For example, the workload manager may determine that the server has a memory and processing capacity to handle the workload. In response to determining that the server can manage the workload, the workload manager may handle migrating the workload to the server. In response to determining that the server cannot handle the workload, the workload manager may implement the procedure with another server in an effort to migrate the workload.

In accordance with embodiments of the present invention, defect information stored in an ECA database, such as database 114 shown in FIG. 1 for example, may be flagged if such a defect may result in a critical component defect. A critical component defect may be one that can result in, for example, data corruption, damage to other components, an environment hazard, or the like. An ECA manager, such as the ECA manager 120 shown in FIG. 1, may detect that a notice is flagged and report the defect to servers having components identified as having the defect.

Figure 3:
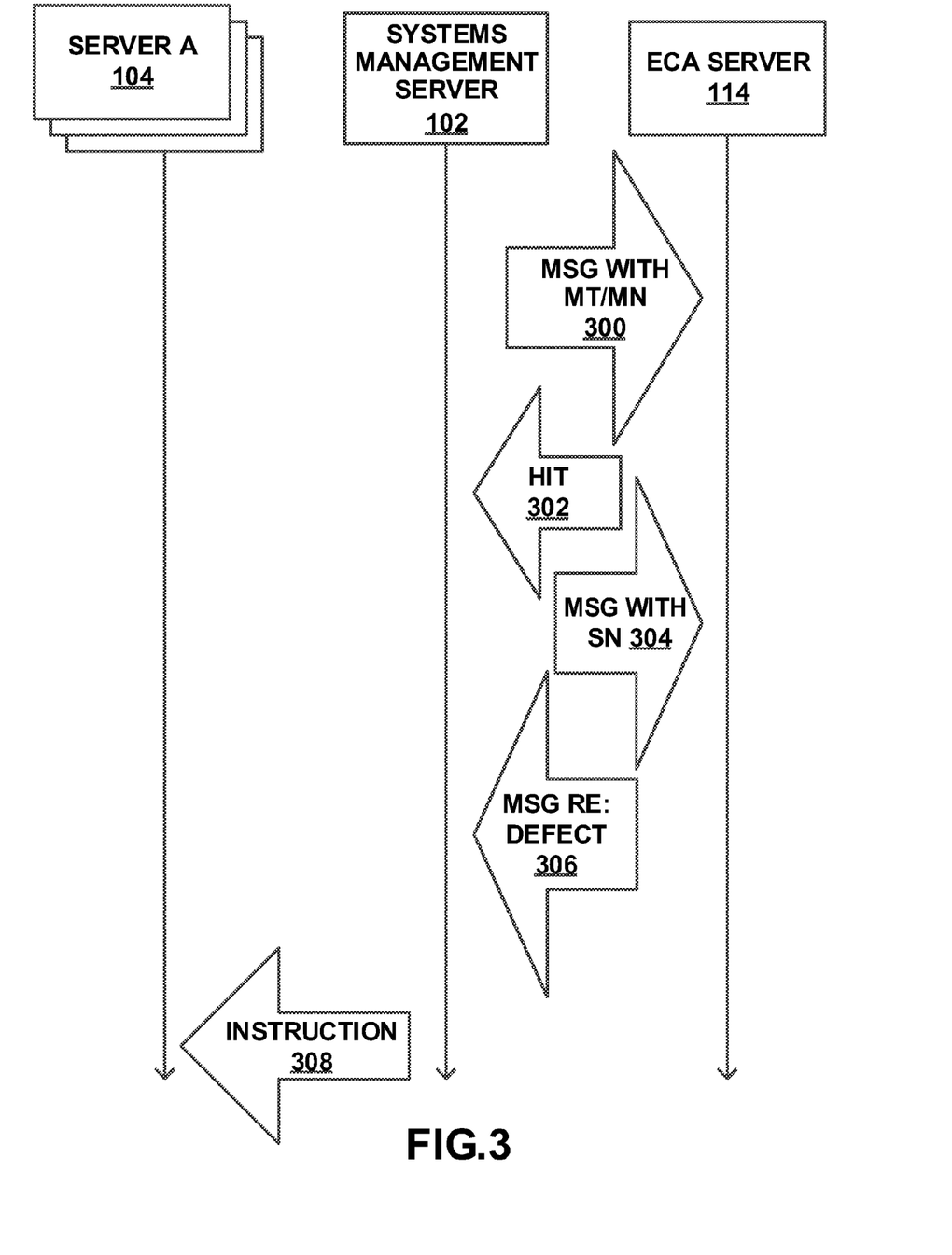
FIG. 3 illustrates a message flow diagram depicting workload and defect management in accordance with embodiments of the present invention.

In accordance with embodiments of the present invention, FIG. 3 illustrates a message flow diagram depicting workload and defect management in accordance with embodiments of the present invention. This example utilizes components depicted in FIG. 1; however, it should be understood that this example may be similarly applied to any other suitable system. Referring to FIG. 3, the systems management server 102 may generate a message 300 including machine type and machine number information of a component of one of the servers 104, 106, and 108. In an example, the server 102 may track the machine type, model number, and serial number describing the IT resource such as, but not limited to, servers 104, 106, and 108. Further, for example, the mapping of components to machine type/model number/serial number may be managed by the ECA database. Server 102 may obtain this information from an inventory process such as, for example, by polling, or by collecting broadcasts (i.e., by employing either a push or pull model). Server 102 may subsequently communicate the message 300 to the ECA server 114.

In response to receipt of the message 300, the ECA server 114 may determine whether there is a defect notice for the identified machine type and machine number. For example, the ECA server 114 may perform a lookup in an ECA database, such as the ECA database 122 shown in FIG. 1, for a defect notice matching the identified machine type and machine number. In response to determining that there is a match, the ECA server 114 may generate a hit message 302 for indicating that a defect notice matches the identified machine type and machine number. The ECA server 114 may subsequently communicate the hit message 302 to the server 102. In response to determining that there is no match, the ECA server 114 may send a message to the server 102 to indicate that there is no match.

In response to receipt of the hit message 302, the server 102 may generate a message 304 containing a serial number of the component. Subsequently, the server 102 may communicate the message 304 to the ECA server 114.

In response to receipt of the message 304, the ECA server 114 may search for a defect notice having the machine type, machine number, and serial number and generate a defect notice message 306 based thereon. Subsequently, the ECA server 114 may communicate the message 306 to the server 102. In response to receipt of the message 306, the server 102 may implement a workload management policy based on the defect notice and communicate an instruction 308 to one or more of the servers 102, 104, and 106 in accordance therewith. As an example, the instruction may be to one of the servers having a defective component for migrating its workload to a backup server.

Figure 4:
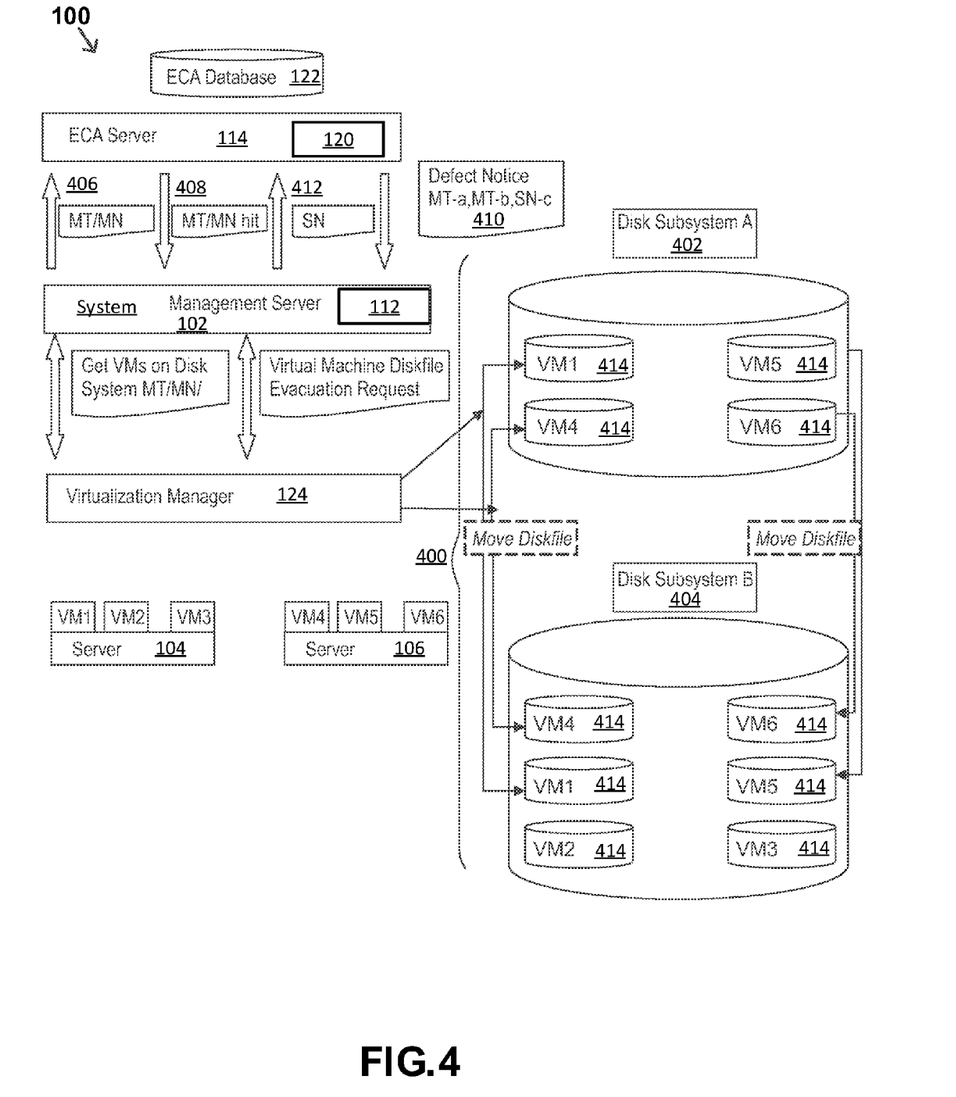
FIG. 4 is a block diagram of an example storage disk file subsystem and defect management system in accordance with embodiments of the present invention.

Referring now to FIG. 4, the figure illustrates a block diagram of an example storage subsystem disk file and defect management system 100 in accordance with embodiments of the present invention. The system 100 includes the systems management server 102 communicatively connected to multiple servers (e.g., a server A 104 and a server B 106) within a server farm or server cluster, wherein there may be a plurality of servers. Servers 102, 104, and 106 may be connected via any suitable network 110 such as a local area network (LAN) or other suitable type of network as described in FIG. 1 above. The server 102 may manage the operations of servers 104, and 106, as they operate in an enterprise environment for serving one or more entities. The servers 104 and 106 may be operating in, for example, a virtualized workload platform, a distributed stateless workload platform, a stateful workload platform, or the like. Further, the servers 104 and 106 may be primary and/or backup servers, and may be collocated with network switches and/or routers which enable communication between the different parts of the cluster and entities using the cluster. Although only two servers are shown in FIG. 4, it should be understood that any suitable numbers of servers of any suitable type may be operated and have functionality in accordance with embodiments of the present invention.

Servers 102, 104, and 106 may each include any suitable hardware, software, firmware, and combinations thereof.

For example, a server may include a high-capacity hard drive, a fan or other cooling equipment, a power supply, and other components. A server may also run a suitable operating system. The servers may each have different types of components associated with one another and some may have components that are the same or similar. The server 102 may maintain a database of identifiers for all or some of the components of the servers 104 and 106 and/or the servers. More particularly, a workload manager 112 residing within the server 102 may receive information about servers 104 and 106 and other servers, including identifiers of components within the servers or identifiers of the servers. Example identifiers include, but are not limited to, a machine type, a model number, a serial number, the like, or combinations thereof. As described in more detail herein, such identifiers may be used by the workload manager 112 for workload and defect management in accordance with embodiments of the present invention.

The workload manager 112 may be implemented by hardware, software, firmware, or combinations thereof. For example, the workload manager 112 may be implemented by one or more processors and memory of the systems management server 102. Alternatively, the workload manager 112 may be implemented by multiple servers managing the servers 104 and 106 and other servers. In this example, the workload manager 112 is implemented by an application operating on the systems management server 102.

In an example, identifiers can be created as part of systems management server 102 inventory collection functionality. Identifiers can be created for all inventoried IT resources. IT resource inventory can be achieved by systems management server 102 polling servers 104 and 106 for their system identifiers. Alternatively, systems management server 102 can gather identifier inventory by collecting inventory broadcast messages from server 104 and 106. Systems management server 102 can store the inventoried identifiers in a persistent data store that resides on systems management server 102, or on an external database connected by a network to systems management server 102.

The system 100 may include one or more storage devices. For convenience of illustration, only one storage device 400 is shown in FIG. 4. The storage device 400 may include one or more disk subsystems. In an example, the disk subsystem 400 may include a disk subsystem A 402 and a disk subsystem B 404. It is noted that the disk subsystem 400 may include one or more other disk subsystems. In the example illustrated in FIG. 4, the system 100 may communicate, to a first computing device such as the ECA Server 114. The system 100 communicates a component identifier 406 associated with a storage device, such as the disk subsystem 402, 404. The component identifier 406 may be a model type (MT) and/or a model number (MN). The systems management server 102, in this example, may receive from the ECA server 114 a MT/MN hit indicator 408. The MT/MN hit indicator 408 may indicate whether the component identifier 406 is stored in the ECA database 122. If the component identifier 406 is found to be stored in the ECA database 122, this may indicate that a defect, problem, or other event condition for the component identifier 406 may exist, and the systems management server 102 may implement a storage defect management policy at the storage device 400 based on the received maintenance information or component identifier 406. To confirm, the systems management server 102 may inquire of the ECA server 114 to identify if there is a defect notice 410 that corresponds to a serial number 412 of the storage device 400, or in any of the plurality of disk subsystems 402 and 404 based on the component identifier 406.

The defect notice 410 may include a defect severity level, and critical rationale information. The defect severity level and critical rationale information may provide additional detail that may form the basis for implementing a storage defect management policy in the storage device 400. In response to the defect notice 410, the system 100 may be configured to migrate at least one disk file 414 on at least one of the plurality of disk subsystems 402, 404 to a second disk subsystem 402, 404 of the plurality of disk subsystems in the storage device 400 based on the storage defect management policy and the received defect notice 410. A disk file 414 is a unit of file information stored on a disk subsystem 402, 404. The disk file 414 may be for a virtual machine residing on a central storage system. The system 100 is notified of critical issues and has the ability to set a service handling policy on issues that have an engineering change advisory. Examples for use are for a class of storage system resource issues that can result in data corruption, a potential environmental hazard in a data center, or a significant performance impact. The system 100 or the associated method allows the IT infrastructure to quickly communicate a class of defect to the system management server 102 and enables the system administrator to set the policy on managing the application workload or storage migration strategy, specifically the workload's Virtual Machine disk file(s) stored on the storage device 400. Implementing the storage defect management policy may be executed by migrating the disk files 414 from a disk subsystem A 402 to a disk file subsystem B 404. The storage defect management policy may also be executed by advising the system administrator to take other automated or manual action based upon the defect notice 410.

Figure 5:
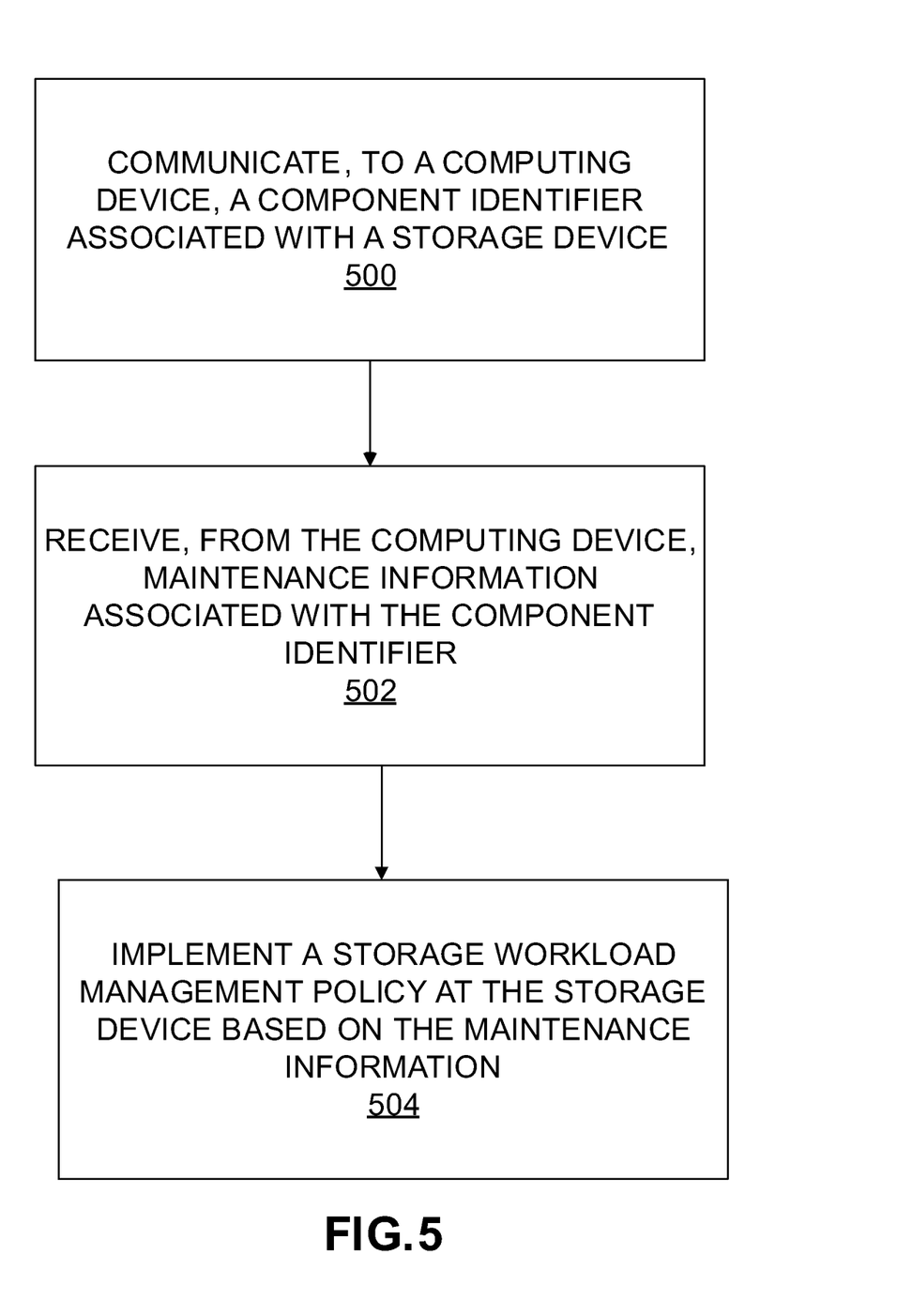
FIG. 5 is a flowchart of an example method for storage subsystem disk file and defect management in accordance with embodiments of the present invention.

FIG. 5 illustrates a flowchart of an example method for implementing a storage defect management policy in accordance with embodiments of the present invention. For purpose of illustration of this method, examples make reference to the system 100 for implementation of the method, although it should be understood that the method may be implemented by one or more other computing devices that are suitably configured.

Referring to FIG. 5, the method includes communicating 500, to a computing device, a component identifier associated with a storage device. For example, the management server 112 shown in FIG. 4 may communicate to the ECA server 114 a component identifier 406. The component identifier 406 may be associated with one or both of the disk subsystems 402 and 404 of the storage device 400.

The method of FIG. 4 includes receiving 502, from the computing device, maintenance information associated with the component identifier. Continuing the aforementioned example, the ECA server 114 may communicate to the management server 102 maintenance information. As an example, the maintenance information may be in the form of a MT/MN hit indicator 408 or a defect notice 410.

The method of FIG. 5 includes implementing 504a storage workload management policy at the storage device based on the maintenance information. Continuing the aforementioned example, the systems management server 102 may implement a storage defect management policy at the storage device 400 based on the received maintenance information.

Figure 6:
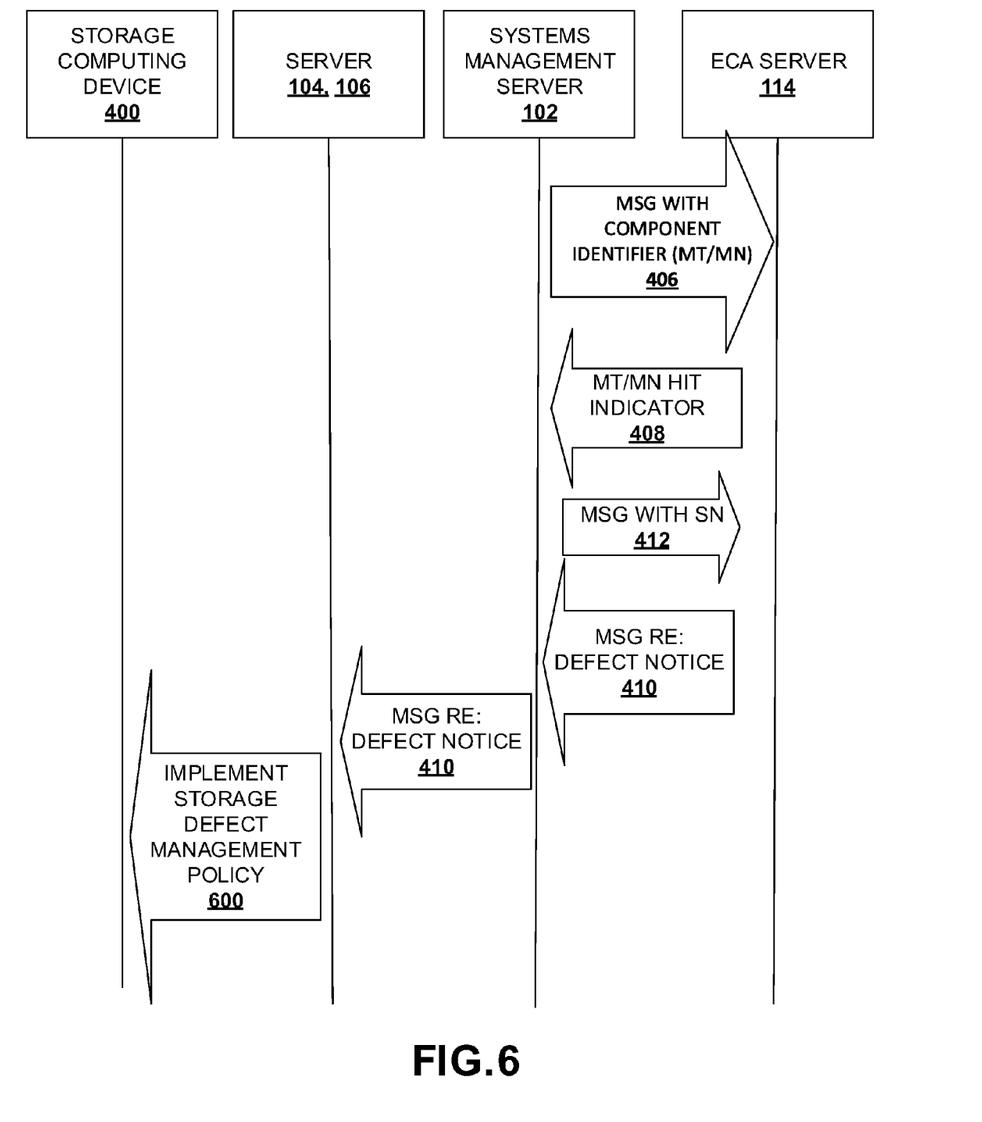
FIG. 6 illustrates a message flow diagram depicting storage subsystem disk file and defect management in accordance with embodiments of the present invention.

In accordance with embodiments of the present invention, FIG. 6 illustrates a message flow diagram depicting workload and defect management in accordance with embodiments of the present invention. This example utilizes components depicted in FIGS. 1 and 4; however, it should be understood that this example may be similarly applied to any other suitable system. Referring to FIG. 6, the systems management server 102 may generate a component identifier 406 including machine type and machine number information of a component of one of the disk subsystems 402, 404 comprised in the storage device 400. In an example, the systems management server 102 may track the machine type, model number, and serial number describing the IT resource such as, but not limited to, disk subsystems 402, 404. Further, for example, the mapping of components to machine type/model number/serial number may be managed by the ECA database 122. The systems management server 102 may obtain this information from an inventory process such as, for example, by polling, or by collecting broadcasts (i.e., by employing either a push or pull component identifier 406 to the ECA server 114).

In response to receipt of the component identifier 406, the ECA server 114 may determine whether there is a defect notice for the identified machine type and machine number. For example, the ECA server 114 may perform a lookup in an ECA database, such as the ECA database 122 shown in FIGS. 1 and 4, for a defect notice 410 matching the identified machine type and machine number of the component identifier 406. In response to determining that there is a match, the ECA server 114 may generate a MT/MN hit indicator 408 for indicating that a defect notice 410 matches the component identified by the machine type and the machine number, as an example. The ECA server 114 may subsequently communicate the MT/MN hit indicator 408 to the server 102. In response to determining that there is no match, the ECA server 114 may send a message to the server 102 to indicate that there is no match.

In response to receipt of the MT/MN hit indicator 408, the server 102 may generate a message 412 containing a serial number of the component. Subsequently, the server 102 may communicate the message 412 to the ECA server 114.

In response to receipt of the message 412, the ECA server 114 may search for a defect notice 410 having the machine type, machine number, and serial number and generate a defect notice message 410 based thereon. Subsequently, the ECA server 114 may communicate the defect notice message 410 to the server 102. In response to receipt of the defect notice message 410, the server 102 may implement a defect management policy based on the defect notice 410 and communicate an instruction 600 for implementing the storage defect management policy to one or more of the servers 102 and 104 in accordance therewith. As an example, the instruction 600 may be to one of the disk subsystems 402, 404 having a defective component for migrating the disk files 414 to a backup disk subsystem 402, 404. It should be noted that the storage defect management policy may also comprise sending an alert to an IT administrator or setting other IT resource management parameters. The systems management server 102 may also map the model type/model number and serial number to the virtualization managers' LUN (logical unit number). Further, if a storage data set migration policy is enabled the systems management server 102 may send a request to one (or more) Virtualization Managers, to determine which VM disk files are stored on the effected storage device or disk subsystems. The systems management server 102 may also send a migration request to the Virtualization Manager to migrate each Virtual Machine's disk file(s) from the affected storage device or disk subsystems to a storage device or disk subsystem not affected by ECA defects. In addition, the systems management server may power off effected storage device or disk subsystem. The systems management server may also be configured to send an email to the IT administrator. Migration policy may also be configured to be triggered based on mitigating critical risks based on the severity or criticality of the defect notice 412.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   at least a processor and memory configured to:
   communicate, to a first computing device, a component identifier associated with a computing storage device;
   receive, from the first computing device, maintenance information associated with the identifier; and
   implement a storage defect management policy at the storage device based on the maintenance information.

2. The system of claim 1, wherein the at least a processor and memory are configured to communicate, to the first computing device, one of a machine type, model number, and serial number associated with the storage device.

3. The system of claim 1, wherein the at least a processor and memory are configured to communicate, to the first computing device, a serial number of a disk subsystem.

4. The system of claim 1, wherein the maintenance information comprises one of a defect notice, a defect severity level, and critical rationale information.

5. The system of claim 1, wherein the storage device comprises a plurality of disk subsystems.

6. The system of claim 5, wherein the storage device comprises a plurality of disk subsystems;
   at least one of the plurality of disk subsystems comprise at least one disk file; and
   wherein the at least a processor and memory are configured to migrate at least one disk file on at least one of the plurality of disk subsystems to a second disk subsystem of the plurality of disk subsystems.

7. The system of claim 6, wherein the storage device operates in one of a virtualized workload platform, a distributed stateless workload platform, and a stateful workload platform.

8. A method comprising:
at least a processor and memory configured to:
communicating, to a first computing device, a component identifier associated with a storage device;
receiving, from the first computing device, maintenance information associated with the component identifier; and
implementing a storage defect management policy at the storage device based on the maintenance information.

9. The method of claim 8, further comprising communicating, to the first computing device, one of a machine type, model number, and serial number associated with the storage device.

10. The method of claim 8, further comprising communicating, to the first computing device, a serial number of a disk subsystem.

11. The method of claim 8, wherein receiving, from the first computing device, the maintenance information, further comprises one of a defect notice, a defect severity level, and critical rationale information.

12. The method of claim 8, wherein communicating, to a first computing device, the component identifier associated with the storage device, the storage device further comprises a plurality of disk subsystems.

13. The method of claim 12, wherein implementing a storage defect management policy at the storage device based on the maintenance information further comprises:
migrating at least one disk file on at least one of the plurality of disk subsystems to a second disk subsystem of the plurality of disk subsystems.

14. The system of claim 13, wherein communicating, to a first computing device, a component identifier associated with a storage device further comprises:
operating the storage device in one of a virtualized workload platform, a distributed stateless workload platform, and a stateful workload platform.

15. A computer program product comprising:
a non-transitory computer readable storage medium having computer readable program code embodied therewith, the computer readable program code comprising:
computer readable program code configured to communicate, to a first computing device, a component identifier associated with a storage device;
computer readable program code configured to receive, from the first computing device, maintenance information associated with the component identifier; and
computer readable program code configured to implement a storage defect management policy at the storage device based on the maintenance information.

16. The computer program product of claim 15, further configured to communicate, to the first computing device, one of a machine type, model number, and serial number associated with the storage device.

17. The computer program product of claim 15, further configured to communicate, to the first computing device, a serial number of a disk subsystem.

18. The computer program product of claim 15, further configured to receive, from the first computing device, the maintenance information, wherein the maintenance information further comprises one of a defect notice, a defect severity level, and critical rationale information.

19. The computer program product of claim 15, further configured to communicate, to the first computing device, the component identifier associated with the storage device, the storage device further comprises a plurality of disk subsystems.

20. The computer program product of claim 19, wherein implementing the storage defect management policy at the storage device based on the maintenance information further comprises:
migrating at least one disk file on at least one of the plurality of disk subsystems to a second disk subsystem of the plurality of disk subsystems.

* * * * *